Oct. 29, 1957     J. E. TREDWAY     2,811,007
POLE SUPPORTED FRUIT PICKER
Filed May 11, 1956
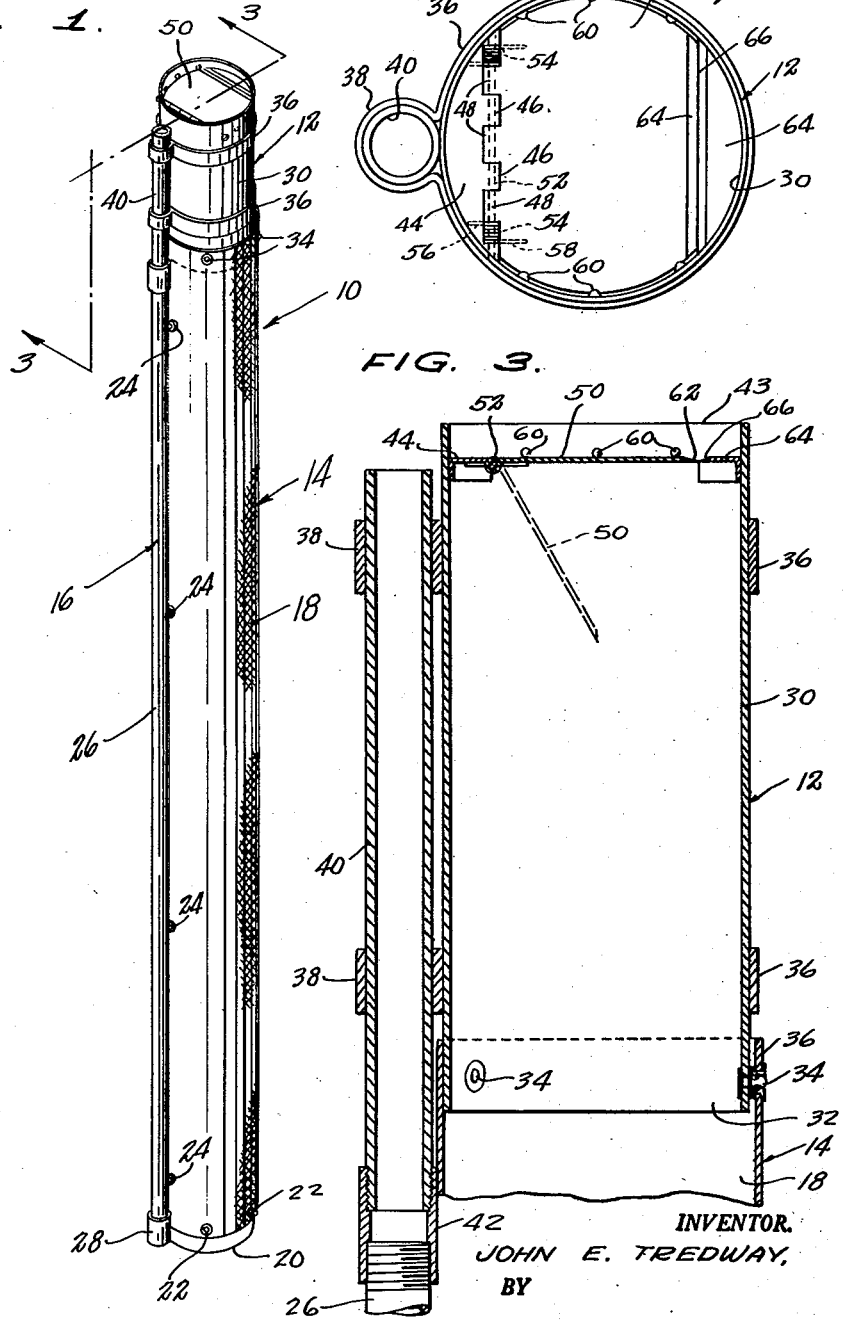
INVENTOR.
JOHN E. TREDWAY,
BY
McMorrow, Berman + Davidson
ATTORNEYS.

United States Patent Office 2,811,007
Patented Oct. 29, 1957

2,811,007

POLE SUPPORTED FRUIT PICKER

John Eugene Tredway, Leggett, Calif.

Application May 11, 1956, Serial No. 584,212

4 Claims. (Cl. 56—336)

This invention relates generally to harvesting apparatus and is more particularly concerned with a novel manually operated fruit picker or gatherer.

A primary object of invention is to provide a novel fruit picking device including means whereby fruit may be properly and expeditiously picked without climbing the tree, including a novel picking head member in conjunction with a communicating conduit member and manipulating handle.

Another object of invention in conformance with that set forth is to provide a fruit picking device of the character involved wherein the fruit picker includes a tubular picking head member having a lower open end in communication with a conduit, the upper end of the picking head member including a pivotally supported fruit ingress door member spring urged toward an upper transverse closing relationship across the picking head member, the ingress door including a picking edge portion in spaced substantially parallel relationship to the axis of rotation of the ingress door, and a fixed member extending transversely of a portion of the inner periphery of the picker head member and including a picking edge disposed substantially parallel to the picking edge of the ingress door.

A further object of invention in conformance with that set forth comprises a novel fruit picker assembly of the character involved which is readily and economically manufactured, easily used and maintained, and highly satisfactory and practical for the purpose intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the novel fruit picker assembly, showing a section of flexible conduit and a handle secured thereon;

Figure 2 is an enlarged top plan view of the novel fruit picker assembly; and

Figure 3 is an enlarged fragmentary sectional view taken substantially on line 3—3 of Figure 1 showing details of the picker head member in phantom lines.

Referring to the drawing in detail, the novel fruit picker assembly is indicated generally at 10 including a picking head member 12, fruit conducting conduit 14 and a manipulating handle 16. The tubular fruit conducting conduit 14 is shown as a single section 18 of any suitable material such as rubber, canvas, etc. and will be constructed of any suitable length.

Although the picker head member 12 and fruit conducting conduit 14 are disclosed as being circular in cross section, this being true of the handle 16, it is to be understood that any suitable cross sectional configuration may be adapted.

The flexible conduit section 18 will be received in the upper end of a similar conduit, and will include about its lower end 20 a plurality of detachable fastener elements 22 which will be engaged with similar cooperating detachable fastener elements about the upper edge of another flexible conduit section whereby the flexible conduit sections will be maintained in substantially longitudinal alignment for conducting therethrough fruit being picked. The conduit section 18, as well as the other sections not shown, include along the outer periphery longitudinally spaced detachable fastening elements 24 which cooperate with fastening elements disposed in spaced relationship on the elongated rod member 26 comprising the handle 16. The rod member 26 will have a lower threaded end for receiving a coupling element 28 therein permitting sections of rod members to be secured in longitudinal alignment whereby the picking assembly may be extended by the user of the same to a substantial height. The lower end 20 of the flexible section 18 may be formed of a relatively hard material such as rubber or plastic for the purpose of providing rigidity to the conduit section and maintaining the same in an open condition permitting the ready passage of fruit therethrough.

The picking head member 12 comprises a tubular body member 30 which has an open bottom end 32 telescopically received in the fruit conduit section 18 and suitable detachable fastening elements 34, see Figure 3, extend between the lower end 32 of the tubular body 30 in the upper end of the flexible conduit for detachably securing said conduit to the picking head member. Circumposed about the outer periphery of the body 30 of the picker head member are spaced support straps 36 which incorporate laterally extending aligned loop portions 38 receiving therethrough a longitudinally extending pipe section 40 threaded at its lower end and receiving thereon a suitable coupling element 42 engageable with the rod 26 of the handle 16.

Disposed below the upper end 43 of the picking head member 12 is a segmental transversely disposed plate member 44 being suitably secured to the inner periphery of the body 30 in any suitable manner, being located adjacent the pipe portion 40 of the handle 16 for the purposes of balance. Said support plate member 44 including integral tubular aligned sleeve portions 46 which are disposed in spaced relationship receiving therebetween cooperating tubular hinge portions 48 of a downwardly pivotal fruit ingress door 50, and extending through suitable aligned journal aperture portions in the body member 30 is a pivotal support rod 52 pivotally supporting the ingress door 50 in the manner clearly seen in Figure 3. Circumposed on opposite ends of the pivot rod 52 is the central portion of a coil spring 54 which includes opposite end portions 56 and 58 respectively in engagement with undersurface portions of the support plate member 44 and the ingress door 50 whereby said door is urged into an upward position substantially horizontal relative to the body portion 30 of the picking head member. Extending inwardly from the inner periphery of the body portion 30 of the picking head member are abutment elements 60 engageable with the upper surface of the ingress door 50 adjacent the edge thereof thus limiting the upward movement of the spring urged ingress door 50. The ingress door 50 terminates in a picking edge portion 62 which is substantially parallel to the pivot rod 52 which defines the axis of pivotal rotation of the ingress door, said picking edge 62 may be beveled to form a sharpened cutting edge as seen in Figure 3.

Extending across the inner periphery of the body portion 30 of the picking head member is a plate member 64, being suitably secured on the inner periphery of said portion 30, said plate member 64 terminating in a picking edge portion 66 which will be substantially parallel to the axis of rotation of the ingress door 50 and in substantially planar alignment with said door 50 when the same is urged into engagement with the abutment element 60.

After the proper diameter of picker head has been selected for the particular fruit to be picked, a suitable number of handle sections and flexible fruit conducting conduit sections are secured together, thereafter a picking head member 12 is moved upwardly with the fruit ingress door 50 coming into engagement with the fruit, the pressure being sufficient to move the ingress door 50 to the position shown by the phantom lines in Figure 3, after the fruit is moved thereby the springs 54 will urge said door back toward the position seen in Figure 3 and downward movement of the picker head will result in severing the stems of the fruit in the event sharpened edges are utilized, as previously mentioned, the fruit passing through the conduit 18 into the hand of the user of the apparatus. In the event sharpened edges are not used on the plate member 64 and the ingress door 50 the springs 54 will be of sufficient strength whereby the stems of the fruit will be grippingly engaged therebetween and by twisting the apparatus the fruit may be readily picked from a tree.

Thus there has been disclosed novel fruit picking apparatus which fully conforms with the objects of invention heretofore set forth.

Various positional directional terms such as "outer," "inner," etc. are utilized herein to have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed is:

1. A fruit picker assembly comprising a tubular picking head member, a tubular fruit delivery conduit in communication with an open lower end portion of the picking head member, and handle means operatively connected to said head member and tubular conduit, said picking head member including an inwardly displaceable fruit ingress door pivotally supported on the inner periphery of the picking head member, resilient means engageable with said ingress door pivotally urging the same toward transverse closing relationship across the upper end of the picking head member, said ingress door including a picking edge portion substantially parallel in spaced relation to the axis of rotation of said ingress door, a fixed member extending transversely of a portion of the inner periphery of said picker head and including a picking edge portion disposed substantially parallel to the picking edge portions of the ingress door, inward movement of said fruit ingress door permitting the picking edge portions to grippingly engage the stems of fruit being picked.

2. A fruit picker assembly comprising a tubular picking head member, a tubular fruit delivery conduit in communication with an open lower end portion of the picking head member, and handle means operatively connected to said head member and tubular conduit, said picking head member including an inwardly displaceable fruit ingress door pivotally supported on the inner periphery of the picking head member, resilient means engageable with said ingress door pivotally urging the same toward transverse closing relationship across the upper end of the picking head member, said ingress door including a picking edge portion substantially parallel in spaced relation to the axis of rotation of said ingress door, a fixed member extending transversely of a portion of the inner periphery of said picker head and including a picking edge portion disposed substantially parallel to the picking edge portion of the ingress door, inward movement of said fruit ingress door permitting the picking edge portions to grippingly engage the stems of fruit being picked, said picking edge portions being beveled toward each other providing sharpened cutting edges for severing the stems of fruit being picked.

3. A fruit picker assembly comprising a tubular picking head member, a tubular fruit delivery conduit in communication with an open lower end portion of the picking head member, and handle means operatively connected to said head member and tubular conduit, said picking head member including an inwardly displaceable fruit ingress door pivotally supported on the inner periphery of the picking head member, resilient means engageable with said ingress door pivotally urging the same toward transverse closing relationship across the upper end of the picking head member, said ingress door including a picking edge portion substantially parallel in spaced relation to the axis of rotation of said ingress door, a fixed member extending transversely of a portion of the inner periphery of said picker head and including a picking edge portion disposed substantially parallel to the picking edge portion of the ingress door, inward movement of said fruit ingress door permitting the picking edge portions to grippingly engage the stems of fruit being picked, said handle means comprising an elongated rod extending longitudinally of the outer periphery of the fruit delivery conduit, said fruit delivery conduit including a plurality of flexible detachable longitudinally aligned sections.

4. A fruit picker assembly comprising a tubular picking head member, a tubular fruit delivery conduit in communication with an open lower end portion of the picking head member, and handle means operatively connected to said head member and tubular conduit, said picking head member including an inwardly displaceable fruit ingress door pivotally supported on the inner periphery of the picking head member, resilient means engageable with said ingress door pivotally urging the same toward transverse closing relationship across the upper end of the picking head member, said ingress door including a picking edge portion substantially parallel in spaced relation to the axis of rotation of said ingress door, a fixed member extending transversely of a portion of the inner periphery of said picker head and including a picking edge portion disposed substantially parallel to the picking edge portion of the ingress door, inward movement of said fruit ingress door permitting the picking edge portions to grippingly engage the stems of fruit being picked, said picker head member including a support member extending partially across the inner periphery thereof pivotally supporting the fruit ingress door thereon, said resilient means comprising a spring extending between the support member and said ingress door, and abutment means engageable with the inwardly displaceable ingress door for aligning the picking edge portions of the picking head member.

References Cited in the file of this patent

UNITED STATES PATENTS

| 777,572 | Utterback | Dec. 13, 1904 |
| 1,152,331 | Mahoney | Aug. 31, 1915 |
| 1,367,889 | Pownell | Feb. 8, 1921 |